Patented May 8, 1951

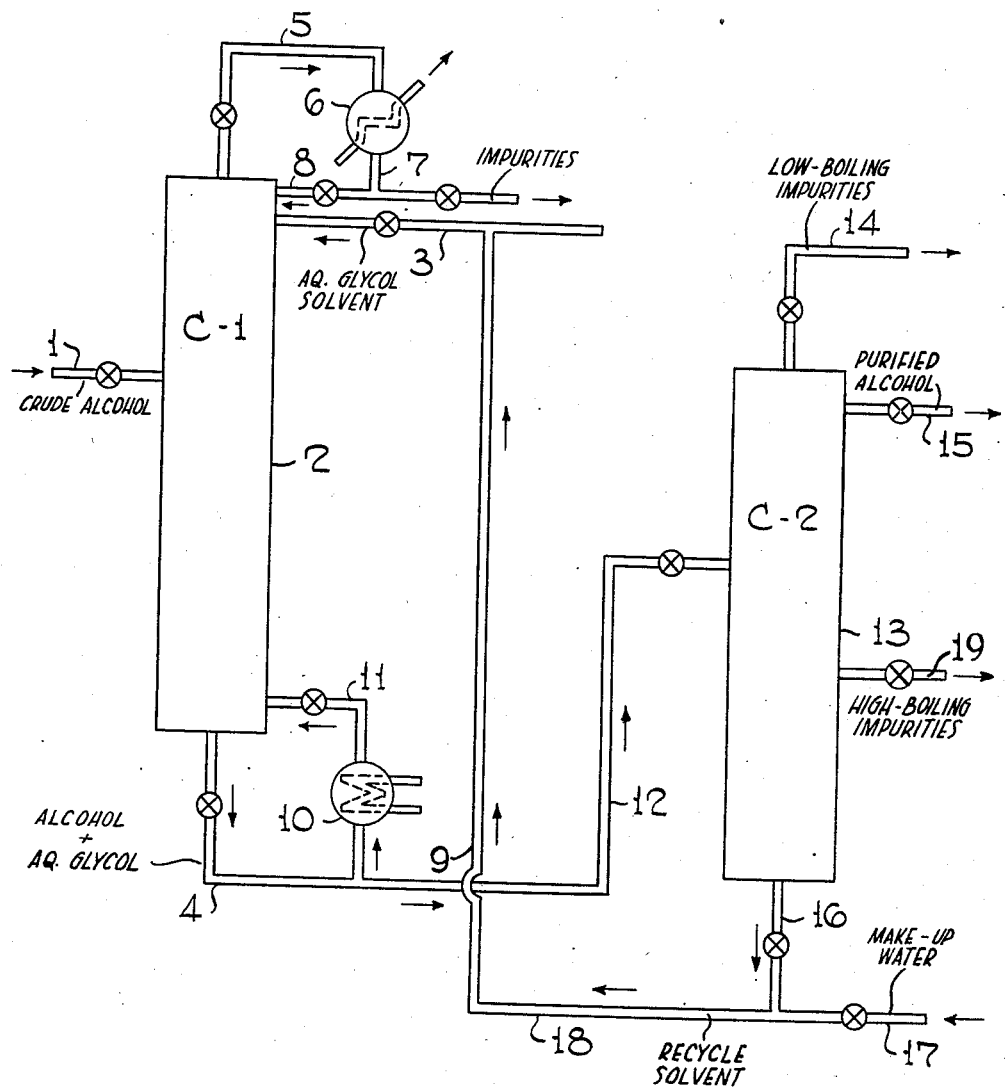

2,552,412

UNITED STATES PATENT OFFICE 2,552,412

PURIFICATION OF ALIPHATIC ALCOHOLS BY EXTRACTIVE DISTILLATION

William M. Drout, Jr., Linden, and Joseph W. Dowling, Union, N. J., assignors to Standard Oil Development Company, a corporation of Delaware Application July 16, 1949, Serial No. 105,184

8 Claims. (Cl. 202—39.5)

This invention relates to the purification of crude aliphatic alcohols produced by the reaction of mono-olefins. The invention is particularly directed to the purification of $C_2$ to $C_6$ alcohols and preferably $C_2$ to $C_4$ alcohols. The invention relates to a process whereby a crude alcohol containing high boiling and low boiling impurities is refined to produce an alcohol of desired color, odor and other physical characteristics. The process is concerned with the treatment of the crude alcohol in an extractive distillation operation employing as the extractive distillation solvent a mixture of water and a compound selected from the group consisting of glycols, glycol ethers and glycol ether esters. The glycol component in the solvent may vary between 20 and 80 volume per cent, preferably 35–45 volume per cent when using ethylene glycol and 40–55% when using propylene glycol.

By operating according to the terms of this invention high yields of highly refined alcohol of excellent odor characteristics can be produced for use in specialized industries, such as, the cosmetic, perfume, drug, biological, vitamin and solvent industries.

It is well known that alcohols particularly those produced by the sulfuric acid catalyzed hydration of olefin hydrocarbons possess a distinct and apparent foreign odor which is slightly penetrating and for the most part disagreeable. The undesirable odor is believed to be caused by the formation of compounds from impurities present in the olefin hydrocarbon stream. The identity of the compounds responsible for the odor is not exactly known, however, high boiling hydrocarbons and sulfur compounds are normally associated with poor odor even when present in minute amounts. It is known that a number of diverse impurities are present in crude alcohol resulting from the catalyzed hydration processes. Crude alcohol normally contains as impurities ethers, ketones, hydrocarbons, higher boiling alcohols, sulfur compounds, etc. For example, crude isopropanol prepared by the sulfuric acid catalyzed hydration of propylene bears the following typical analysis:

Crude isopropanol

| | |
|---|---|
| Isopropanol | 90 volume per cent |
| Diisopropyl ether | 5–10 volume per cent |
| Acetone | |
| Hydrocarbons (B. P. 60–300° C. major portion 100–300 C.) | |
| Oxygenated compounds other than acetone incl. ethers, tertiary butyl alcohol and higher alcohols, higher ketones, etc. | up to 2 volume per cent |
| Traces of sulfur compounds, boiling over a wide range. | |

The following are approximate typical compositions of other crude aqueous alcohols which may be treated according to this purification process:

Crude secondary butyl alcohol

| | |
|---|---|
| Vol. per cent sec. BuOH | 74.9 |
| Methyl ethyl ketone | 0.1 |
| t-BuOH | 1.0 |
| Sec.-butyl ether | 3.5 |
| Isopropanol | 0.5 |
| Water | 17.5 |
| Unidentified hydrocarbons and other materials | 2.5 |

Crude ethyl alcohol

80–85 wt. per cent ethyl alcohol
9–14 wt. per cent ethyl ether
0.2–0.8 wt. per cent hydrocarbons (B. P. 30–300° C.)
2.5–5 wt. per cent colloidal carbon

Crude secondary amyl alcohols 50 vol. per cent sec.-amyl alcohol
20 vol. per cent hydrocarbons
5–10 vol. per cent sec-butyl alcohol
2–5 vol. per cent tertiary amyl alcohol
5–10 vol. per cent water
2–3 vol. per cent ethers, e. g. sec-amyl, sec-butyl and mixed ethers
2–5 vol. per cent higher alcohols, e. g. hexyl alcohols
1–2 vol. per cent ketones, e. g. diethyl ketone or methyl propyl ketone In Serial No. 24,626 filed May 1, 1948, in the name of William M. Drout, Jr. and others there is described and claimed an alcohol purification process by means of extractive distillation employing water as the extractive distillation solvent. Except for the modification of the solvent the process of the present application is similar to that described in S. N. 24,626 which is incorporated herein by reference.

According to the present invention the crude aqueous alcohol containing impurities of the type described above is subjected to a distillation operation in which the crude homogeneous alcohol solution is fed to a distillation tower at an intermediate point thereof, and in which a solvent consisting of a mixture of water and a glycol component is fed to the top of the tower or at a point near the top thereof in sufficient quantity to maintain a composition of 70–99.9 volume per cent solvent preferably 75–90 volume per cent solvent in the liquid phase in the distillation column. It is essential that the concentration of the glycol component be maintained in the range of 20–80%, preferably 35–45%. It is necessary therefore to control the water content to maintain the glycol component at this concentration level bearing in mind that water may be present in the crude alcohol feed and that some water is lost as overhead from the distillation column. The operable solvent concentration will vary with the crude alcohol mixture being purified, for example, ethanol 70–99 volume per cent, preferably 75 to 90%; isopropanol 70–99 volume per cent, preferably 75 to 90%; secondary butanol 70–99.9 volume per cent, preferably 75–90 volume per cent; and secondary amyl alcohols 70–99.9 volume per cent, preferably 80 to 95%. Operation at elevated temperature and pressure greatly broadens the solubility range of the alcohols which approach water immiscibility. Another method of enhancing the water solubility of the higher aliphatic alcohols such as the secondary butanols, the pentanols, hexanols, etc., is the addition of a solubilizer such as isopropanol or tertiary butanol to the solvent.

The extractive distillation solvent supplied to the distillation column is sufficient to permit the removal overhead from the column of all or substantially all the impurities contained in the crude alcohol, namely the ethers, ketones, other alcohols, light hydrocarbons and even all or a substantial portion of the high boiling hydrocarbons known as polymer oils. Thus it is seen that many of the impurities removed overhead boil normally at a temperature above the boiling point of the alcohol which is being purified.

It has been found that a 95–97 volume percent yield of highly purified alcohol can be obtained by using a 50-plate extractive distillation column followed by a 30-plate conventional concentration column to recover the alcohol from the aqueous glycol solvent. The alcohol concentration in the aqueous glycol extract (extractive distillation column bottoms) can vary from 5 to 30 volume percent, preferably 20–25 volume percent without appreciably affecting alcohol quality or yields.

When operating in the manner outlined it was found possible to recover the following amounts of impurities present in feed alcohol in the overhead from the extractive distillation column when purifying crude secondary butyl alcohol.

| | Volume percent |
|---|---|
| Secondary butyl ether | essentially 100 |
| Methyl ethyl ketone | essentially 100 |
| Hydrocarbons | essentially 100 |
| Secondary butyl alcohol | 1–5 |
| Water | 5–70 |

The amount of organic material ejected from the extractive distillation column heads will depend upon the amount of impurities present. Normally 8–15% of the organic material in the crude alcohol feed was ejected in the heads.

The accompanying drawing represents a flow plan in elevation of one process and accompanying apparatus for carrying out the purification of the alcohol. The process will be described with reference to the purification of secondary butyl alcohol employing aqueous ethylene glycol as the extractive distillate. The description is by no means limiting and is employed for purpose of example only.

Referring to the drawing numeral 2 represents an extractive distillation tower such as a 50-plate column to which crude secondary butyl alcohol containing from 0–30 volume percent water and impurities of the type previously described is fed via line 1 at an intermediate point in the column preferably around the 30th to the 40th plate. The solvent consisting of a mixture of water and ethylene glycol containing 40 volumes percent ethylene glycol is fed to the top of the column at the 50th plate via line 3. To obtain the desired separation of the impurities from the alcohol the mixture is subjected to a continuous fractional distillation in column 2. The aqueous ethylene glycol solvent introduced in sufficiently large quantity, for example 70 to 99.9 volume percent, at the upper part of the tower effectively modifies the relative volatilities of the organic compounds being separated and distillation of substantially all of the impurities from the secondary butanol is effected. Secondary butanol, free of impurities and dissolved in water and ethylene glycol is removed from the bottom of the tower via line 4. The impurities such as secondary butyl ether, methyl ethyl ketone, other alcohols, water and hydrocarbons are removed overhead via line 5, condensed in condenser 6 and removed from the system via line 7. If desired part of the overhead condensate may be returned to the tower via line 8 as reflux, however, the column is preferably operated without external reflux. Part of the dilute alcohol bottoms is removed via line 9, passed through reboiler 10 and returned to tower 2 via line 11 to supply the necessary distillation heat. The bulk of the bottoms is sent via line 12 to a conventional 30-plate fractionating tower 13 where the alcohol is subjected to distillation. In column 13 an overhead vapor stream 14 consisting of any remaining traces of light boiling impurities and some secondary butyl alcohol is removed. Any traces of high boiling impurities can be removed as a side stream 19 just below the feed plate. The purified product which consists of the secondary butyl alcohol-water azeotrope is removed as a top sidestream via line 15. Ethylene glycol is recovered from the bottom of the tower via line 16. Required make-up water is added via line 17 and the mixture recycled via line 18 to line 3 as the extractive distillation solvent.

The temperature of the solvent feed to the extractive distillation tower is preferably close to the temperature of the liquid on the solvent feed plate although it may be lower to partially condense vapors ascending to the solvent feed plate. For continuous efficient operation the solvent must be added continuously near the top of the column while the crude alcohol is continuously fed at a lower point and while sufficient heat is provided to afford distillation throughout the column. The feed stream may be preheated to a temperature close to that of the internal liquid reflux under equilibrium boiling conditions at the point of introduction. The preheated alcohol feed stream may be liquid, partially vaporized, or completely vaporized when introduced into the fractionation column. Vapors of the organic compounds pass upwardly through the distillation zone in contact with the descending water-ethylene glycol internal liquid reflux under equilibrium reboiling and refluxing conditions.

The quantity of solvent required to be introduced continuously at the upper part of the distillation column for accomplishing the desired separation of the impurities from the alcohol is considerably greater than the quantity of condensate with which it becomes homogeneously mixed on each plate in order to make the solvent concentration of the internal reflux substantially above a critical minimum in the range of 70 to 99.9 volume per cent. With adequate solvent concentration in the internal reflux for effecting the separation of the impurities the alcohol to be recycled to the aqueous glycol bottoms is dissolved in the internal reflux leaving the bottom of the column. Excellent quality alcohol has been obtained by adjusting the alcohol to solvent feed ratio so that 20-25 volume per cent alcohol was obtained in the bottoms from the extractive distillation column.

In the separation of impurities from the aliphatic alcohols essentially no satisfactory separation is effected if the internal reflux contains less than 70 volume per cent solvent. For obtaining satisfactory results on a practical scale the preferred range is 75 to 90 volume per cent solvent.

Recycle of the glycol solvent does not appear to have any deleterious effect on alcohol quality. One sample of solvent was employed in seven process cycles and still showed no signs of deterioration or decline in efficiency.

In the distillation process the amount of water in the total overhead from the extractive distillation column will vary with the operating conditions and with the nature of the impurities rejected overhead. The overhead from the extraction distillation column upon condensing and cooling frequently separates into two phases, an upper organic phase and a lower aqueous phase. Distillation of a typical organic phase reveals from boiling point analyses that materials boiling considerably lower and considerably higher than the alcohol being purified are present.

Although the invention has been described employing aqueous ethylene glycol as the extractive distillation solvent, other glycols, glycol ethers and glycol esters may be employed. Suitable glycols in addition to ethylene glycol are: propylene glycol-1,3; propylene glycol-1,2; butylene glycol-1,2; butylene glycol-1,3; butylene glycol-1,4; diethylene glycol, dipropylene glycol, triethylene glycol, tetraethylene glycol, hexaethylene glycol, nonaethylene glycol. However, the glycols appear to be somewhat better than the glycol ethers.

Suitable glycol ether-esters to be used in the process of the present invention include the monomethyl ether acetate of diethylene glycol, the monoethyl ether acetate of diethylene glycol, the monopropyl ether acetate of diethylene glycol, the monobutyl ether acetate of diethylene glycol, the methyl ether acetate of ethylene glycol, the ethyl ether acetate of ethylene glycol, the methoxytriglycol acetate and the corresponding derivatives of propylene glycol and poly-propylene glycols.

Suitable glycol-esters to be used in the process of the present invention include monomethyl-ether of ethylene glycol, the monoethyl ether of ethylene glycol, the n-propyl ether of ethylene glycol, the isopropyl ether of ethylene glycol, the monobutyl ether of ethylene glycol, the monomethyl ether of diethylene glycol, the monoisopropyl ether of diethylene glycol, the monobutyl ether of diethylene glycol, the diethyl ether of ethylene glycol, the diethyl ether of diethylene glycol, the dibutyl ether of ethylene glycol, the dibutyl ether of diethylene glycol, dimethoxy tetraglycol, dibutyloxytetraglycol, and the corresponding derivatives of propylene glycol and poly-propylene glycols.

Although illustrated by the purification of secondary butyl alcohol, the invention is equally adaptable to the aliphatic alcohols particularly the alcohols which have appreciable water solubility, namely alcohols of 2 to 6 carbon atoms. When employed for the purification of alcohols containing more than 6 carbon atoms it is recommended that a solubilizer be added to the solvent. Normal amyl alcohol is a suitable solubilizer.

The following data obtained from runs made in a 50 plate distillation tower illustrate the invention with respect to the purification of secondary butanol. In these runs crude secondary butanol was fed to the 40th plate of the column and the indicated glycol solvent was fed to the 50th plate. In the runs listed the crude alcohol Table

| Run # | Vol. Per Cent Glycol in Solvent | Vol. Per Cent SBOH in Extract Column Bottom | Reflux to Heads Ratio | Per Cent Organics in Feed Removed in Heads | Optical Density of Product SBOH Compared to $H_2O$ | | Odor of Prod. Compared to Commercial SBOH | Per Cent SBOH Recovered in Ext. Col. Btms. |
|---|---|---|---|---|---|---|---|---|
| | | | | | 2250 Å | 2700 Å | | |
| ETHYLENE GLYCOL OPERATION | | | | | | | | |
| 1 | 70 | 22.4 | 0 | 10:1 | 1.170 | 0.099 | Equal | 99.4 |
| 2 | 60 | 15.2 | 0 | 10:7 | 0.460 | 0.069 | Superior | 94.9 |
| 3 | 50 | 23.7 | 0 | 12.7 | 0.354 | 0.022 | do | 94.8 |
| 4 | 40 | 16.75 | 0 | 14.4 | 0.265 | −0.014 | do | 94.0 |
| 5 | 30 | 23.0 | 0 | 12.9 | 0.430 | 0.001 | do | 94.4 |
| 6 | 20 | 18.2 | 0 | 11.8 | 0.923 | 0.293 | do | 100 |
| 8 | 40 | 25.5 | 0 | 10.3 | 0.160 | −0.014 | do | 99 |
| 18 | 40 | 11.60 | 0 | 8.66 | 0.409 | 0.200 | do | 99.5 |
| 22 | 40 | 19.4 | 0 | 15.4 | 0.094 | −0.021 | do | 91.0 |
| 24 | 40 | 21.3 | 0 | 17.8 | 0.090 | −0.025 | do | 91.8 |
| 25 | 40 | 21.75 | 0 | 13.7 | 0.100 | −0.020 | do | 96.8 |
| 29 | 40 | 12.4 | 0 | 10.0 | 0.105 | 0.005 | do | 100 |
| DIETHYLENE GLYCOL OPERATION | | | | | | | | |
| D-1 | 50 | 15.6 | 0 | 19.2 | 0.485 | −0.005 | Superior | 90.2 |
| D-2 | 50 | 19.0 | 0 | 16.1 | 0.650 | −0.002 | do | 88.6 |
| D-3 | 50 | 16.5 | 0 | 16.0 | 0.630 | −0.002 | do | 88.5 |
| D-4 | 50 | 24.6 | 0 | 14.3 | 0.340 | −0.010 | do | 96.0 |
| 1,3-PROPYLENE GLYCOL OPERATION | | | | | | | | |
| P-1 | 40 | 14.8 | 0 | 21.3 | 0.238 | −0.010 | Superior | 89.2 |
| P-3 | 40 | 20.4 | 0 | 16.1 | 0.440 | 0.000 | do | 94.0 |
| P-5 | 40 | 26.2 | 0 | 14.1 | 0.485 | 0.000 | do | 96.2 |
| P-7 | 55 | 17.1 | 0 | 15.3 | 0.330 | 0.000 | do | 94.6 |
| P-8 | 25 | 17.7 | 0 | 17.1 | 0.675 | −0.010 | do | 92.6 | varied in composition between the following limits:

| | Volume per cent |
|---|---|
| MEK | 0.08– 0.10 |
| t-BuOH | 0.30– 1.50 |
| Hydrocarbons | 0.1 – 2.45 |
| Sec-butyl ether | 3.46– 7.0 |
| Isopropyl alcohol | 0.0 – 0.76 |
| Water | 11.9 –22.80 |
| Sec-BuOH | 69.10–74.88 |

The optical density of the refined alcohol reflects a decided improvement over that of the presently available commercial secondary butanol which has an optical density at 2250 Å. of 2.0+.

Secondary butyl ether is the largest and most troublesome contaminant found in crude secondary butyl alcohol. It may vary in concentration in the crude in amounts up to about 7 vol. per cent in the refined product in normal concentrations of about 0.5 vol. per cent although occasionally it may exceed 2%. Vapor-liquid equilibrium data indicate that the separation of secondary butyl ether from secondary butyl alcohol is greatly improved by the presence of an ethylene glycol-water solvent. The relative volatility of the ether to the alcohol in the presence of water alone is practically 1.0 which makes separation impossible. The relative volatility of the ether to the alcohol in the presence of water containing 20 vol. per cent ethylene glycol is 2.9, while in water containing 80 vol. per cent ethylene glycol it increases to 18.0.

The aqueous ethylene glycol acts as a selective solvent which modifies the relative volatilities of such impurities present in the alcohol as hydrocarbons, ethers and ketones. The aqueous glycol "holds" the alcohol in solution. If the glycol were not present in the aqueous solvent, the "holding" power of the water would be greatly reduced, and excessive amounts of sec-butyl alcohol would be removed overhead with the impurities, and the separation of impurities such as secondary butyl ether from the alcohol would be by no means complete. Secondary butyl alcohol and water are not miscible in all proportions which explains the reason for the poor "holding" power of the water alone. The addition of 20 vol. per cent or more of glycol to the water makes the secondary butyl alcohol and water completely miscible and thus greatly increases the "holding" power of the water. Glycols and glycol type compounds such as glycol ethers and glycol esters show great affinity for alcohol and water but do not have appreciable affinity for aliphatic hydrocarbons, ethers or ketones.

What is claimed is:

1. The method of refining a crude aliphatic alcohol containing 2 to 6 carbon atoms per molecule produced by reaction of a mono-olefin, said crude alcohol containing contaminants lower boiling and higher boiling than the alcohol, which comprises continuously feeding the crude alcohol to a fractional distillation zone at an intermediate point thereof, continuously adding a sufficient amount of a solvent consisting of a 20–80 vol. per cent aqueous solution of a substance selected from the group consisting of aliphatic glycols, glycol-ethers and glycol-esters, to the fractional distillation zone at a point substantially above the crude alcohol feed point to maintain an internal liquid reflux having a solvent content in the range of 70–99.9 volume per cent below the point of addition of the solvent, distilling from said crude alcohol a vaporous mixture comprising both lower boiling and higher boiling contaminants wherein the distilled vaporous mixture flows countercurrent to the aqueous solvent reflux, and continuously withdrawing a solution of the solvent and alcohol freed of the thus distilled contaminants from a lower portion of said fractional distillation zone.

2. A process according to claim 1 in which the aliphatic alcohol is secondary butanol and in which the solvent is a 20–80 vol. per cent solution of ethylene glycol in water.

3. A process according to claim 2 in which the solvent is a 35–45 vol. per cent solution of ethylene glycol in water.

4. A process according to claim 1 in which the aliphatic alcohol is secondary butanol and in which the solvent is a 20 to 80 vol. per cent 1,3-propylene glycol in water.

5. A process according to claim 4 in which the solvent is a 40–55 vol. per cent solution of 1,3-propylene glycol in water.

6. A process according to claim 1 in which the aliphatic alcohol is secondary butanol and in which the solvent is a 20 to 80 vol. per cent solution of diethylene glycol in water.

7. A process according to claim 6 in which the solvent is a 50 vol. per cent solution of diethylene glycol in water.

8. A process according to claim 1 in which the solvent content of the internal reflux is 75 to 90 vol. per cent.

WILLIAM M. DROUT, JR.
JOSEPH W. DOWLING.

REFERENCES CITED

The following references are of record in the file of this patent:

UNITED STATES PATENTS

| Number | Name | Date |
|---|---|---|
| 2,080,111 | Bump | May 11, 1937 |
| 2,273,923 | Bludworth | Feb. 24, 1942 |
| 2,290,442 | Metzl | July 21, 1942 |